United States Patent Office 2,722,594
Patented Nov. 1, 1955

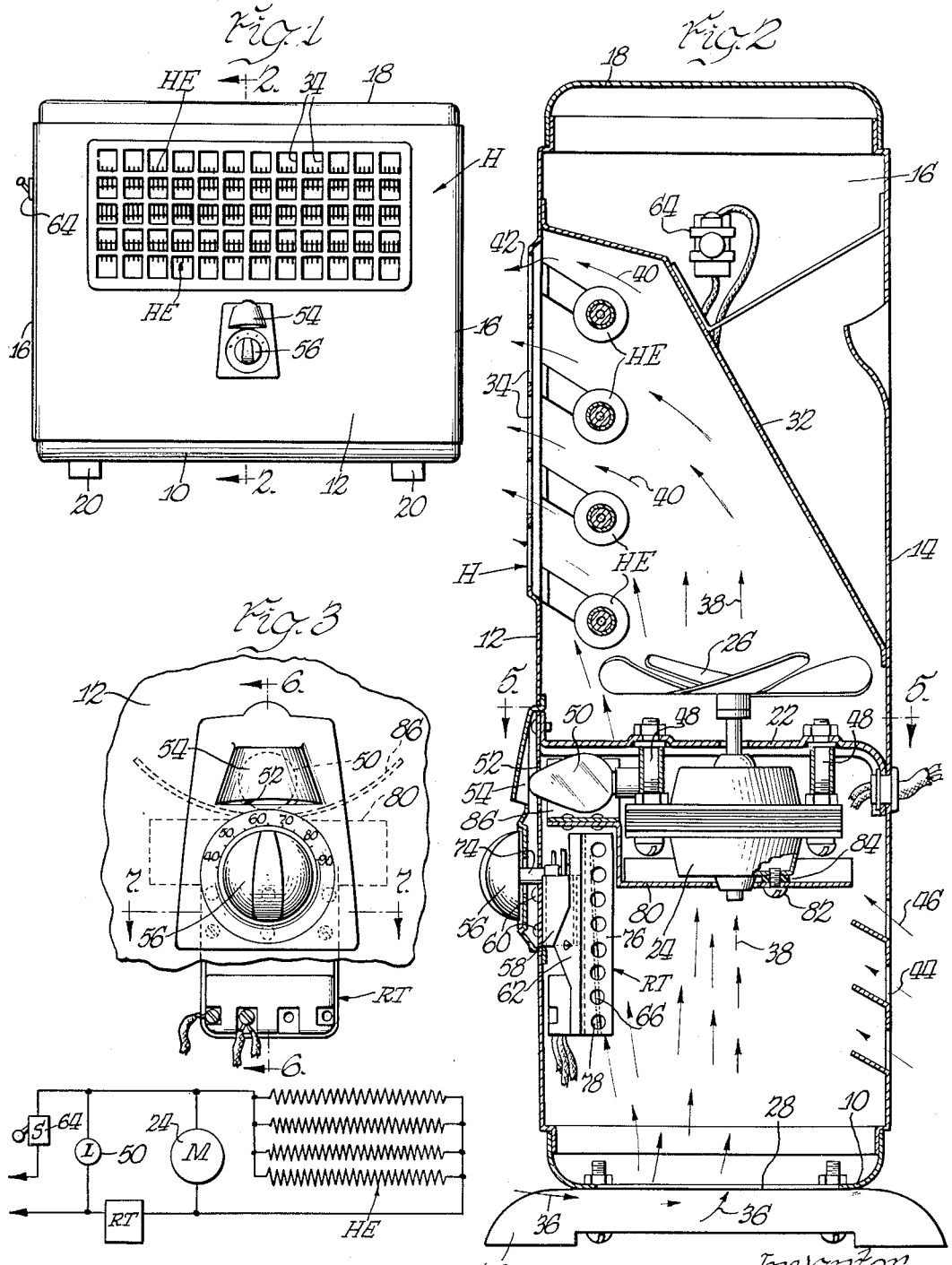

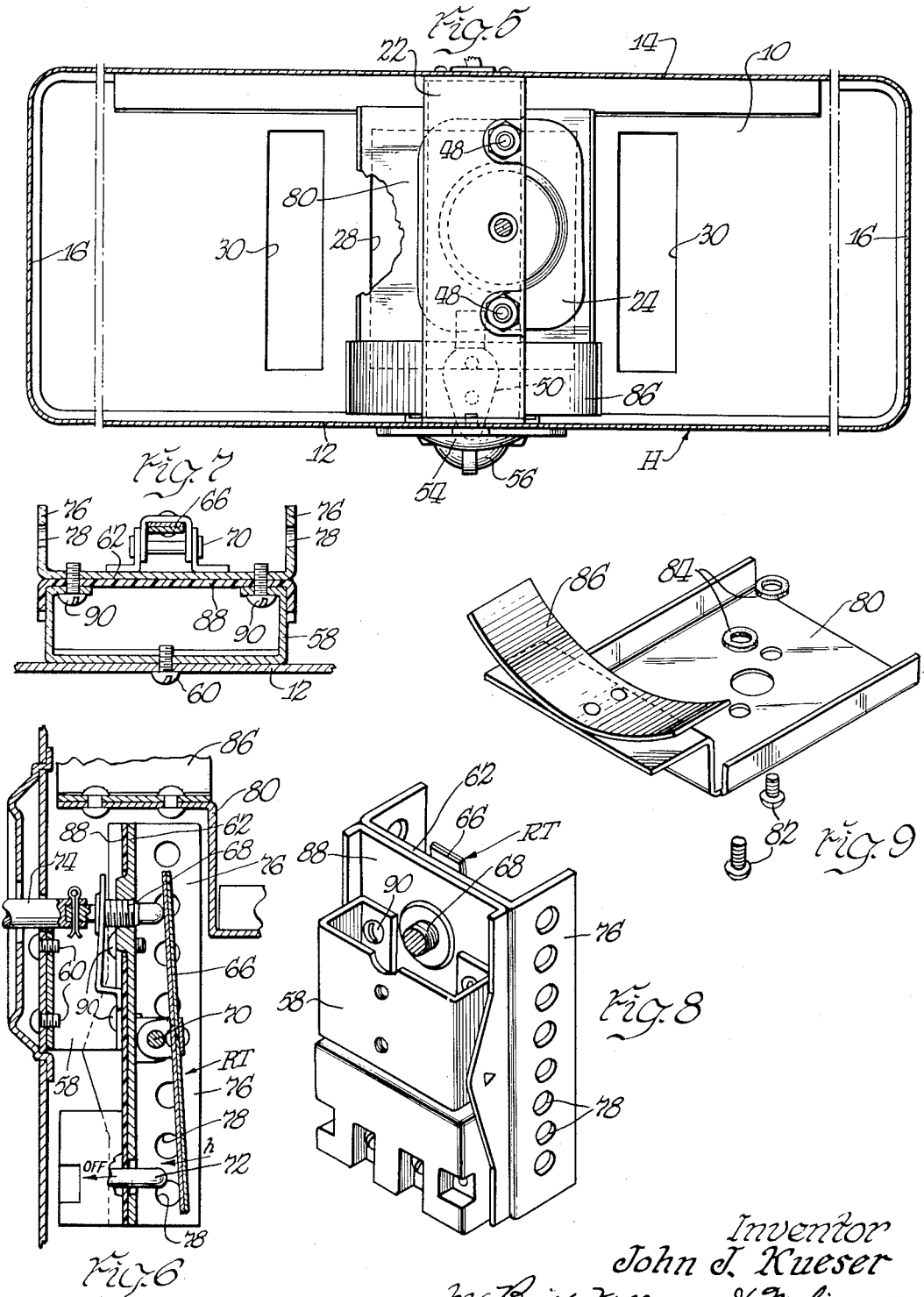

2,722,594

TEMPERATURE CONTROL FOR ELECTRIC HEATERS

John J. Kueser, St. Louis, Mo., assignor to Knapp-Monarch Company, St. Louis, Mo., a corporation of Delaware Application February 24, 1953, Serial No. 338,349

3 Claims. (Cl. 219—39)

This invention relates to a temperature control for electric heaters and particularly those types of heaters generally referred to as "portable room heaters." Heaters of this character having heating elements which are electrically energized and including a small electric motor and fan for circulating the air over the heating elements before it is discharged into the room are the kind particularly referred to. Usually a control switch is provided for turning on the motor and heating elements together or for turning on the heating elements alone as desired. Where the capacity of the heater is greater than required by the room, the heat soon becomes excessive and the heating elements must be turned off manually until the room is cool again and then they must be turned on if further heat is desired.

One object of the present invention is to provide a room thermostat incorporated in a room heater of the general character disclosed for automatically controlling the energization and deenergization of the heating elements and the fan motor so that a substantially even temperature can be maintained without manual attention.

Another object is to provide a room thermostat, and so associate it with the housing of the room heater and the other elements therein, that it is responsive as desired to room temperature even though located in the housing of the room heater where the heat is generated and would affect the room thermostat undesirable if provision were not made for proper response of the thermostat to the incoming air as distinguished from the temperature within the room heater.

Still another object is to design the heater so as to provide an air flow pattern therethrough which makes the thermostat therein primarily responsive to room temperature by so directing and concentrating the air that enters the housing of the heater that it passes over the temperature responsive element of the room thermostat before it goes through the fan and is circulated over the heating elements and discharged into the room.

A further object is to provide a heat baffle between the fan motor and the room thermostat to prevent the heat of the motor from undesirably affecting the temperature responsive element of the room thermostat.

Still a further object is to provide the baffle with a portion to prevent heat from a pilot light in the room heater from affecting the room thermostat and to provide mountings for the heat baffle and the temperature responsive element of the room thermostat which insulate them from the motor and from the room heater housing respectively, thus further insuring that the major response of the temperature responsive element is to the temperature of the incoming room air, and to provide a heater which has a ruddy glow for attractiveness with a soft glow to light up the thermostat dial.

With these and other objects in view, my invention consists in the construction, arrangement and combination of the various parts of my temperature control for electric heaters, whereby the objects contemplated are attained, as hereinafter more fully set forth, pointed out in my claims and illustrated in the accompanying drawings, wherein:

Figure 1 is a front elevation of a room heater of the general character to which I have applied my room thermostat.

Figure 2 is an enlarged vertical sectional view on the line 2—2 of Figure 1 and shows the relationship of the room thermostat to the other elements in the heater.

Figure 3 is a fragmentary front elevation of an adjacent portion of Figure 2 showing the temperature control knob for the room thermostat which can be set for various desired temperatures.

Figure 4 is an electro-diagrammatic view showing circuits used in the room heater when my room thermostat is incorporated therein.

Figure 5 is a horizontal sectional view on the line 5—5 of Figure 2 to show the relationship of certain parts.

Figure 6 is an enlarged vertical sectional view on the line 6—6 of Figure 3 showing details of the room thermostat.

Figure 7 is an enlarged horizontal sectional view through the room thermostat as taken on the line 7—7 of Figure 3.

Figure 8 is a perspective view of components of the thermostat; and

Figure 9 is a perspective view of the heat shield used between the fan motor and the room thermostat.

On the accompanying drawings I have used the reference character H to indicate in general a housing. The housing H has a bottom wall 10, a front wall 12, a back wall 14, an end wall 16 and a top wall 18. A pair of feet 20, preferably of heat insulating material, serve to space the bottom wall 10 above the floor surface on which the feet rest.

Substantially centrally located both vertically and horizontally within the housing H is a motor bracket 22. A motor 24 is supported thereon and is provided with fan blades 26. The direction of rotation of the motor is such as to circulate air upwardly through the housing H.

To form a desirable air flow pattern, the bottom wall 10 is provided with a central opening 28 and a pair of smaller openings 30 on each side thereof as shown in Figure 5, all three openings being laterally adjacent the center of the housing. Above the fan blades 26 a deflector 32 deflects the air toward hot air discharge openings 34 in the front wall 12. Before discharge, however, the air passes over finned heating elements HE such as those of the type disclosed in Pass Patent No. 2,562,436. In Figure 2 the incoming air is indicated by arrows 36 which air then flows upwardly and around the sides of the bracket 22 as indicated at 38 then across the heating elements as indicated at 40, and is finally discharged as indicated at 42 through the hot air discharge openings 34. The back 14 of the housing H may also be provided with air inlet openings 44 through which additional room air flows as indicated by the arrows 46.

The motor 24 is supported on the bracket 22 as by means of the posts 48. A pilot light bulb 50 (preferably red) is supported in front of the motor 24 to extend through an opening 52 in the front wall 12 and shine from the bottom edge of a light deflector 54 onto a control knob 56 which will later be described. The bulb 50 thus causes a soft glow of light to shine on the temperature setting numerals of a nameplate 57 for easy reading in a dark room.

A room thermostat is indicated generally at RT. It comprises a supporting bracket 58 secured as by screws 60 to the front wall 12, a mounting plate 62, a switch unit 64, a temperature responsive element 66 in the form of a bimetal blade and an adjusting screw 68 to change the range of operation of the room thermostat. The bimetal blade 66 is pivotally mounted at 70 on the mounting plate 62 and is adapted to be engaged by the adjusting screw 68 at one of its ends while the other end is adapted to warp toward and engage an actuating pin 72 of the switch 64 to open the switch when warpage corresponds to a predetermined cut-off temperature for the heating elements. The control point may be adjusted by rotating the screw 68 which is connected by means of a stem 74 with the control knob 56.

The mounting plate 62 has side flanges 76 for reinforcement purposes and these are preferably perforated as shown at 78 to permit the room air entering as indicated by the arrows 36 to flow freely all around the bimetal element 66 before flowing as indicated by the arrow 38 past the motor 24 and the bracket 22. Thus the bimetal 66 is primarily responsive to room temperature as it is wiped by the air that enters the bottom openings 28 and which air therefore is at room temperature instead of an elevated temperature as attained by subsequent contact with the heated parts of the room heater H.

As a further insurance against receiving heat by radiation from the motor 24 and the pilot light 50, I provide a heat baffle 80 which is supported on the motor as by screws 82 and insulating washers 84 which minimize the conduction of heat from the motor to the baffle. The baffle also has a reflector 86 for the pilot light 50 which in addition to serving as a reflector therefor, baffles the heat thereof with respect to the room thermostat. The upper surfaces of the baffle 80 and the reflector 86 are preferably bright such as by nickel or chromium plating in order to be more effective in reflecting heat upwardly away from the room thermostat and thus help to further isolate it from the heat of the heating elements HE as well as from the motor 24 and the pilot light 50.

Also there is some problem of heat conduction from the wall 12 to the room thermostat and this is minimized by means of a sheet of insulation 88 located between the mounting bracket 58 and the mounting plate 62, the two being secured together as by screws 90.

As already mentioned, the air flow pattern is such as to secure response of the room thermostat to the actual temperature of the room air. The incoming air being at room temperature keeps the temperature of the thermostat RT down to about 2½ to 3 degrees F. above the actual room temperature. This slight difference between thermostat temperature and room temperature is used to advantage in my design since the thermostat will then have an automatic anticipating action. This, of course, is recognized as desirable for all types of room temperature controlling devices.

The 2½ to 3 degrees F. temperature difference noted is the result of some conduction and radiation of heat from the housing H, the motor 24, the pilot light 50 and the heating elements HE. The air flow pattern is such, however, that the residual heat in the heating elements, which would otherwise normally affect the thermostat and give abnormally long off cycles, is directed upwardly by the combination effect of the natural air draft present in the type of housing disclosed and the brightly plated baffle 80 and reflector 86. The small amount of heat that does creep down from the heating elements to the thermostat level when the fan is off is directed around the thermostat by the baffle 80 and the reflector 86 in such a way that, as far as air flow is concerned, only the incoming air 36 comes in contact with the thermostat.

The baffle 80 also serves to insulate the thermostat from the heat dissipated by the fan motor and since it is mounted on the motor the insulating washers 84 are used to prevent the baffle from conducting the heat of the motor and reflecting it to the thermostat. In this connection I have found that the baffle 80 is more effective as a heat insulating barrier when it is brightly plated because its plated upper surface reflects heat back upwardly or away from the thermostat instead of absorbing that heat and radiating it downwardly toward the thermostat. The insulation 88 also serves to insulate the room thermostat sufficiently from conducted heat of the housing H itself so that its proper operation is not interfered with and only the desired amount of anticipation mentioned is secured.

By providing the particular air flow pattern disclosed in combination with a specially designed baffle 80 which is so located between the room thermostat and the heating components of the heater that the thermostat operates stably at a temperature approximately equal to the incoming room temperature, the thermostat is effective to control the room air temperature even though the thermostat is mounted inside the heater housing itself, and the use of the thermal isolation at 84 and 88 contributes in this respect.

I preferably finish the inner surfaces of the walls 14 and 32 with dull red enamel to cooperate with the red bulb 50 in providing soft internal lighting of the room heater which produces a ruddy glow, thus a reminder that the heater is on. A single bulb thus serves as both a dial indicator and for internal illumination.

Some changes may be made in the construction and arrangement of the parts of my temperature control for electric heaters without departing from the real spirit and purpose of my invention, and it is my intention to cover by my claims any modified forms of structure or use of mechanical equivalents which may be reasonably included within their scope.

I claim as my invention:

1. In a temperature control for electric room heaters, the combination with a housing which is substantially rectangular in cross-section, a motor and fan disposed therein intermediate the height thereof, and electric heating elements adjacent the front wall of said housing above said motor, said front wall having a plurality of hot air discharge openings all disposed entirely above said motor and adjacent said heating elements; of a room thermostat mounted on and insulated from said front wall, located adjacent and below said motor and having a heat responsive element for responding to the temperature of incoming room air entering said housing, said housing having air intake openings all disposed entirely below said motor and located with respect to said room thermostat to direct all incoming air upwardly and to concentrate a substantial portion thereof on said heat responsive element prior to its flow upwardly around said motor and through said fan, and a heat baffle overlying said room thermostat and disposed below said motor and insulated therefrom, the upper surface of said heat baffle being bright to reflect heat of said motor and heating elements upwardly away from said room thermostat.

2. In a temperature control for electric room heaters, the combination with a housing, a motor and fan disposed therein, a pilot light adjacent said motor, and electric heating elements adjacent the front wall of said housing above said motor, said front wall having a plurality of hot air discharge openings all disposed entirely above said motor and adjacent said heating elements; of a room thermostat having a heat responsive element and being mounted on said front wall within said housing adjacent and below said motor, means disposed entirely below said motor for directing all incoming air upwardly and concentrating a substantial portion thereof on said heat responsive element prior to its flow upwardly around said motor and through said fan, a heat baffle overlying said room thermostat and disposed below said motor, said heat baffle having a portion located between said pilot light and said room thermostat, the upper surface of said heat baffle being bright to reflect heat of said motor and heating elements upwardly away from said room thermostat, the interior of said housing being a dull red to reflect a soft glow from said pilot light through said air discharge openings, and a dial for adjusting said room thermostat having a slot through which some of the light of said pilot light shines thereon.

3. In a temperature control for electric room heaters, the combination with a housing which is substantially rectangular in cross-section, a bracket disposed therein intermediate the height and intermediate the ends thereof so that air can flow past said bracket on opposite sides thereof, a motor and fan mounted on said bracket, a pilot light adjacent said motor, electric heating elements adjacent the front wall of said housing above said fan and motor, said front wall having a plurality of hot air discharge openings all disposed entirely above said motor and adjacent said heating elements, openings in the bottom and rear wall of said housing for air entry, all of said entry openings being located entirely below said bracket; of a room thermostat mounted in said housing adjacent said bracket and having a heat responsive element for responding to the temperature of incoming room air entering through said entry openings which are located so as to concentrate a substantial portion of the incoming air flow over said heat responsive element prior to its flow around said bracket, motor and fan, and a heat baffle overlying said room thermostat and disposed below said motor, said heat baffle having a portion located between said pilot light and said room thermostat.

References Cited in the file of this patent

UNITED STATES PATENTS

| | | |
|---|---|---|
| 2,492,774 | Wild | Dec. 27, 1949 |
| 2,619,578 | Jepson et al. | Nov. 25, 1952 |